(12) United States Patent
Stanley

(10) Patent No.: US 8,488,238 B2
(45) Date of Patent: Jul. 16, 2013

(54) MICROSCOPE CUBE

(75) Inventor: Charles Michael Stanley, Putney, VT (US)

(73) Assignee: Chroma Technology Corporation, Rockingham, VT (US)

( * ) Notice: Subject to any disclaimer, the term of this patent is extended or adjusted under 35 U.S.C. 154(b) by 433 days.

(21) Appl. No.: 12/849,938

(22) Filed: Aug. 4, 2010

(65) Prior Publication Data

US 2011/0032609 A1 Feb. 10, 2011

Related U.S. Application Data

(60) Provisional application No. 61/232,583, filed on Aug. 10, 2009.

(51) Int. Cl.
*G02B 21/00* (2006.01)

(52) U.S. Cl.
USPC ............ 359/368; 359/381; 359/389; 359/839

(58) Field of Classification Search
USPC ................. 359/368, 385, 388, 389, 839, 872, 359/884, 892
See application file for complete search history.

(56) References Cited

U.S. PATENT DOCUMENTS

| | | | | |
|---|---|---|---|---|
| 4,640,589 A | * | 2/1987 | Reich | 359/350 |
| 6,097,538 A | | 8/2000 | Watanabe et al. | |
| 6,400,501 B2 | * | 6/2002 | Tsuchiya et al. | 359/380 |
| 6,519,101 B2 | * | 2/2003 | Bell et al. | 359/896 |
| 6,539,046 B2 | * | 3/2003 | Newman et al. | 372/98 |
| RE38,307 E | * | 11/2003 | Gustafsson et al. | 359/385 |
| 6,750,972 B2 | * | 6/2004 | Sandstrom et al. | 356/454 |
| 6,873,418 B1 | * | 3/2005 | Howey et al. | 356/451 |
| 7,283,306 B2 | * | 10/2007 | Mikuriya et al. | 359/634 |
| 7,298,550 B2 | * | 11/2007 | Nishiwaki et al. | 359/384 |
| 7,400,802 B2 | * | 7/2008 | Wyatt et al. | 385/52 |
| 7,502,164 B2 | | 3/2009 | Lytle et al. | |
| 7,808,701 B2 | * | 10/2010 | Ouchi | 359/388 |
| 8,172,412 B2 | * | 5/2012 | Solyar et al. | 359/872 |
| 8,310,754 B2 | * | 11/2012 | Okugawa et al. | 359/385 |
| 2002/0054296 A1 | | 5/2002 | Parks et al. | |
| 2003/0228703 A1 | * | 12/2003 | Hoppe et al. | 436/172 |
| 2004/0252379 A1 | | 12/2004 | Weiss | |
| 2005/0168826 A1 | * | 8/2005 | Koulikov et al. | 359/641 |
| 2008/0043324 A1 | | 2/2008 | Lytle et al. | |
| 2008/0106743 A1 | * | 5/2008 | Tafas et al. | 356/445 |
| 2009/0323180 A1 | * | 12/2009 | Weber et al. | 359/359 |
| 2010/0171946 A1 | | 7/2010 | Hecker | |

FOREIGN PATENT DOCUMENTS

| | | | |
|---|---|---|---|
| JP | 2000-235 148 A | * | 8/2000 |
| JP | 2006-189741 | | 7/2006 |

OTHER PUBLICATIONS

"V19, Tools of the Trade", Thorlabs.com Catalog, 2007 [retrieved on Dec. 12, 2012]. Retrieved from the Internet: <URL: http://www.thorlabs.com/images/Catalog/Vol19.pdf>.*

* cited by examiner

*Primary Examiner* — Frank Font
(74) *Attorney, Agent, or Firm* — Occhiuti Rohlicek & Tsao LLP

(57) ABSTRACT

A microscope cube includes a housing including a first opening on a first wall of the housing and a second opening on a second wall of the housing, the first wall adjacent to the second wall; an excitation filter disposed within the first opening; an emission filter disposed within the second opening; and a dichroic mirror positioned within the housing. In one aspect, the dichroic mirror has a thickness greater than or equal to 1.5 mm. In another aspect, the excitation filter is positioned at an angle relative to the first wall of the housing.

17 Claims, 6 Drawing Sheets

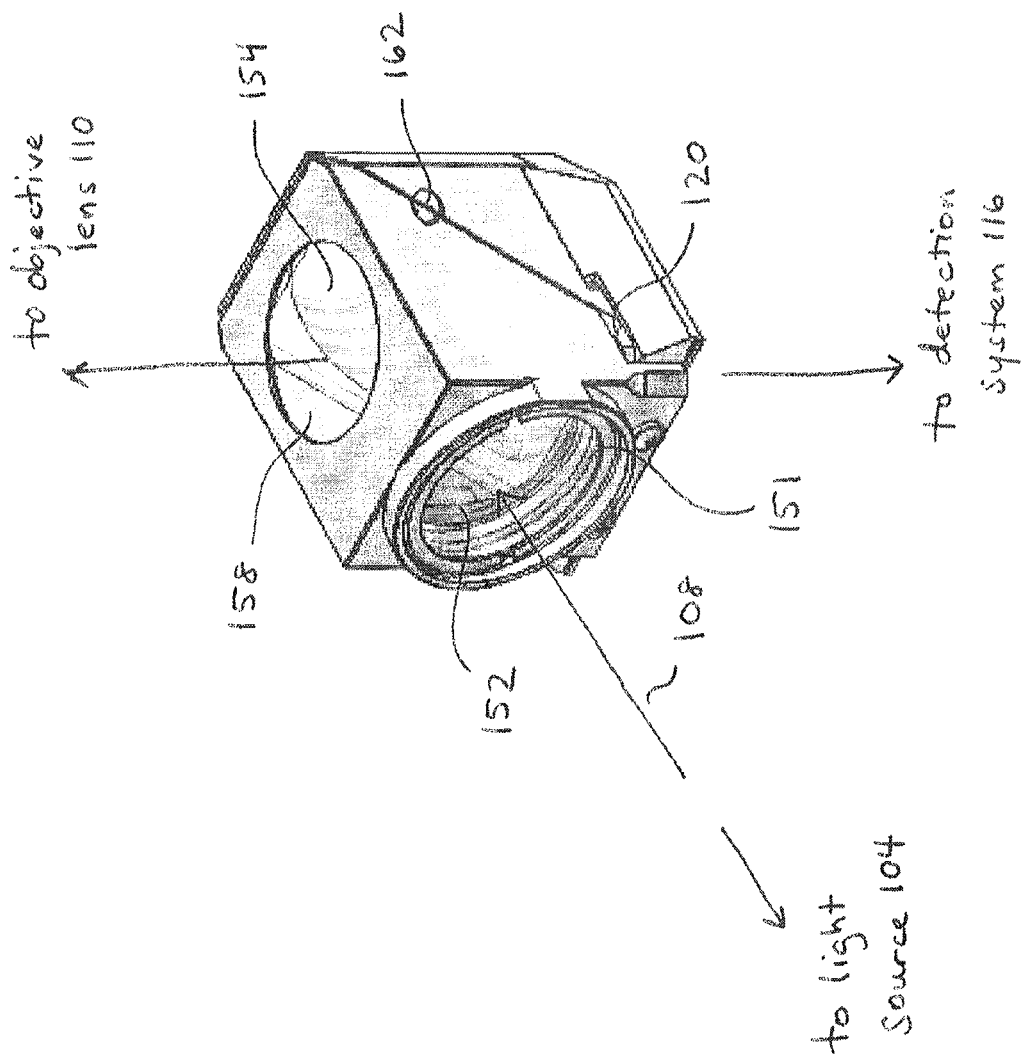

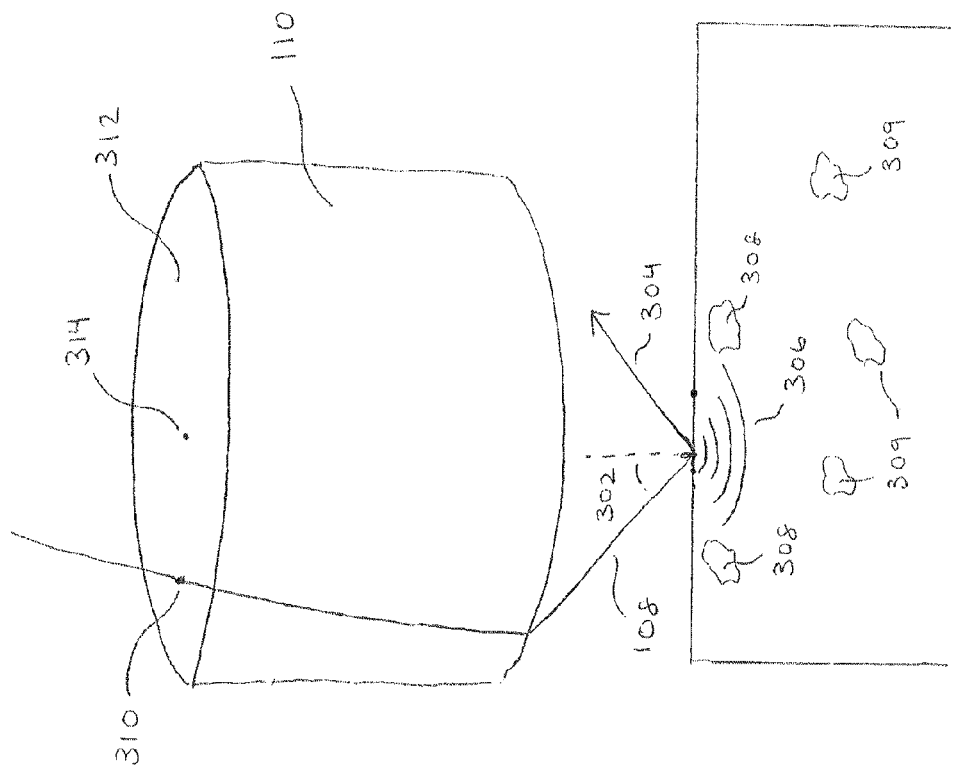

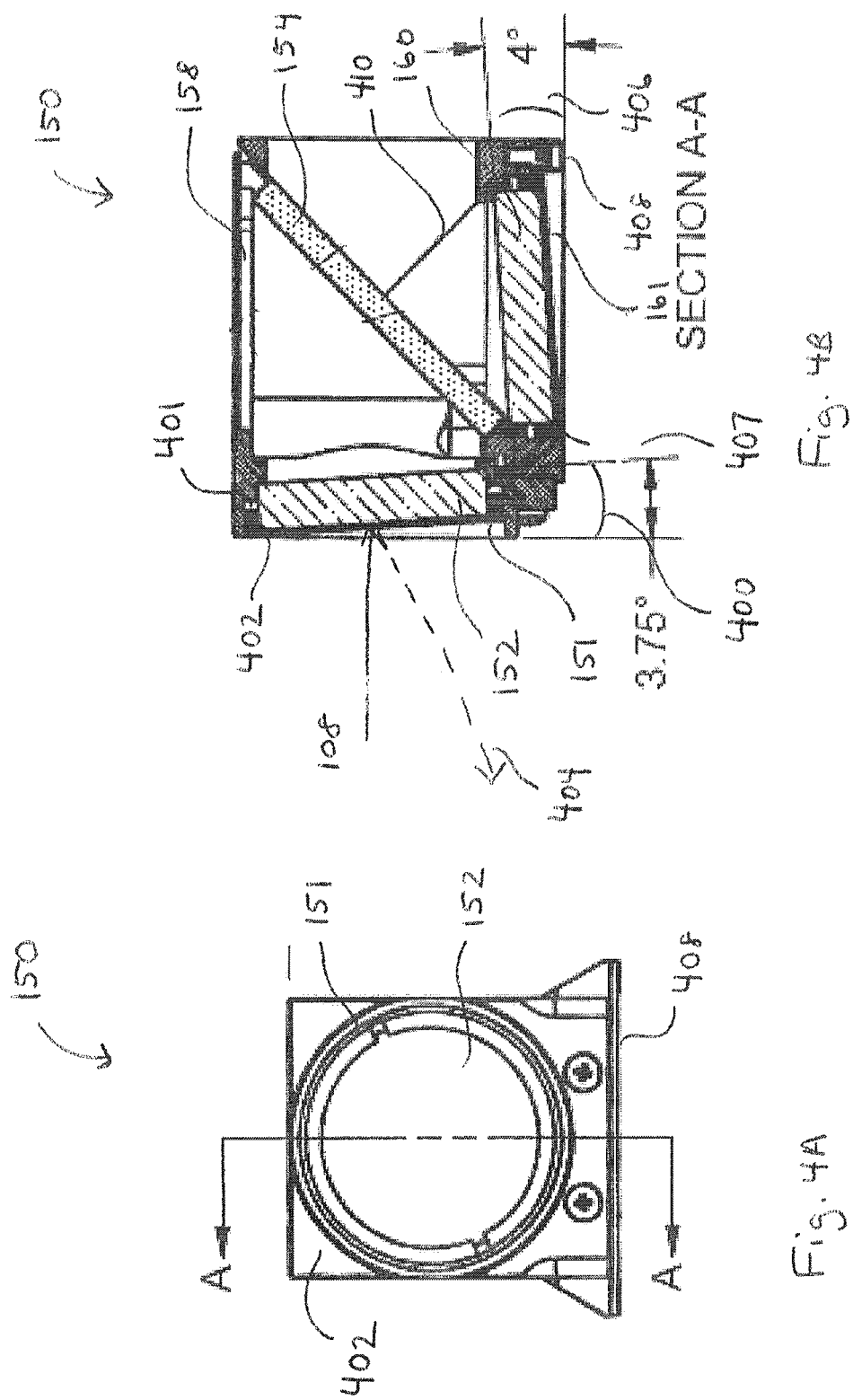

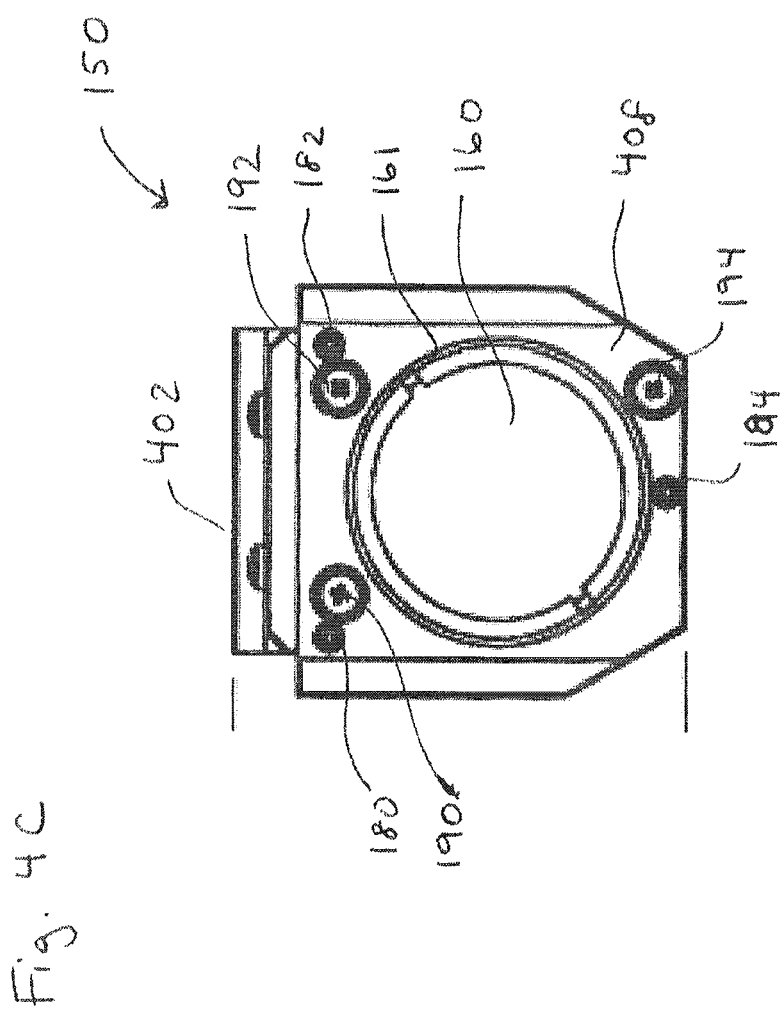

MICROSCOPE CUBE

CROSS-REFERENCE TO RELATED APPLICATION

This application claims priority to U.S. provisional application Ser. No. 61/232,583, filed Aug. 10, 2009, and entitled "Microscope Cube," the contents of which are herein incorporated by reference.

FIELD OF THE INVENTION

This invention relates to microscope cubes.

BACKGROUND

Fluorescence microscopy is a light microscopy technique for studying the structure or properties of a sample by imaging fluorescent or phosphorescent emission from target species, such as organic molecules or inorganic compounds, located on or in a sample. For instance, a sample may be labeled with fluorophores, molecules that absorb light around an excitation wavelength and, in response, fluoresce, emitting light at an emission wavelength typically longer than the excitation wavelength. A fluorescence image of the sample is obtained by detecting the emitted fluorescence.

Total internal reflection fluorescence (TIRF) microscopy is a technique that probes fluorescence only near the surface of a sample. In TIRF, total internal reflection of incident light occurs when a light beam impinges on a sample at or greater than a critical angle, which depends at least in part on optical properties of the sample and the surrounding environment. Although the incident light is reflected, an evanescent wave having the same wavelength as the incident light is generated in the sample. The evanescent wave decays exponentially away from the surface of the sample and penetrates only a small depth into the sample. Thus, only fluorophores near the surface of the sample are excited. Because only a small region of the sample is probed by TIRF, the signal-to-noise ratio of the resulting image is improved relative to standard fluorescence microscopy techniques.

SUMMARY

In a general aspect, a microscope cube includes a housing having a first opening on a first wall of the housing and a second opening on a second wall of the housing, the first wall adjacent to the second wall; an excitation filter disposed within the first opening; an emission filter disposed within the second opening; and a dichroic mirror positioned within the housing. The dichroic mirror has a thickness greater than or equal to 1.5 mm.

In another aspect, a microscope cube includes a housing including a first opening on a first wall of the housing and a second opening on a second wall of the housing, the first wall adjacent to the second wall; an excitation filter disposed within the first opening; an emission filter disposed within the second opening; and a dichroic mirror positioned within the housing. The excitation filter is positioned at an angle relative to the first wall of the housing.

Embodiments may include one or more of the following. The dichroic mirror has a thickness between 2 mm and 3 mm. The dichroic mirror is positioned to receive light incident from the first opening and light incident from the second opening. The excitation filter is positioned at an angle relative to the first wall of the housing. The angle between the excitation filter and the first wall is between 0° and 10°, e.g., about 3.75°. The emission filter is positioned at an angle relative to the second wall of the housing. The angle between the emission filter and the second wall is between 0° and 10°, e.g., about 4°.

An angle between the dichroic mirror and the first wall is adjustable. The angle between the dichroic mirror and the first wall is adjusted manually or by a piezoelectric driver. An angle between the dichroic mirror and the second wall is adjustable. The microscope cube further includes a third wall in contact with both the first wall and the second wall, and an angle between the dichroic mirror and the third wall is adjustable.

The microscope cube is configured for removable insertion into a microscope. The microscope cube is configured to receive light from a laser. The microscope cube is made of metal. The microscope cube further includes an adapter for attachment to a laser breadboard. Optical characteristics of the excitation filter, the emission filter, and the dichroic mirror are selected on the basis of optical characteristics of a target sample.

Among other advantages, the microscope cube described herein is well suited for various applications involving laser light sources. Any incident light from a laser that is reflected by the tilted excitation filter is not reflected back along the same path as the incident light. The reflected light is thus prevented from re-entering the laser, avoiding a situation which could induce an interference pattern in the laser cavity and potential damage or even destroy the laser. A tilted emission filter helps to reduce internal reflections (i.e., reflections within the microscope cube) that may arise from the incident laser light or from fluorescence emitted by the sample and that can create an undesirable interference pattern in the image plane.

An extremely flat dichroic mirror with a smooth surface is important for TIRF microscopy. The microscope cube described herein is capable of accepting a thick dichroic mirror. In general, it is both less expensive and easier to generate a flat, smooth surface on a thick mirror than it is to do so on a thin mirror. However, a thick mirror may have a non-negligible effect on the path of the light beam, which effect can be calculated to determine the beam path within the microscope. Furthermore, a thicker mirror substrate reduces optical effects that arise from any stress or torque that is applied to the mirror.

The angle of the dichroic mirror in the microscope cube is adjustable to allow better alignment of the critical TIRF angle. An adjustable dichroic mirror further allows the microscope cube to be used in various microscope models or for other non-commercial, custom applications and at various wavelengths. The angle of the dichroic mirror is adjusted to align the optical elements of the microscope cube with the optical elements of the particular microscope to achieve more precise TIRF conditions. Similarly, the angle of the mirror can be adjusted to achieve TIRF conditions for a given excitation wavelength. An adjustable mirror also has advantages for improving image registration between different microscope cubes within a turret of a microscope.

A further advantage of the microscope cube described herein is its mechanical stability. A microscope cube made of metal imparts little or no torque on the optical elements within, even if it is inserted slightly off angle in a microscope. A tightly fit stopcock system or a bolted mount into the microscope further stabilizes the microscope cube in the microscope. Stability of the microscope cube is important to ensure that, once aligned for TIRF, the optical elements are not disturbed by torque, vibrations, or other mechanical forces.

More generally, the dimensions of the microscope cube and the positioning of the mirrors and filters within the microscope cube are customizable to various microscope models.

BRIEF DESCRIPTION OF DRAWINGS

FIG. 2 is a perspective view of a microscope cube.

FIG. 3 shows an objective lens positioned relative to the surface of a sample under TIRF conditions.

FIG. 4A is a front view of the microscope cube of FIG. 2.

FIG. 4B is a cross-sectional view along section A-A of the microscope cube of FIG. 4A.

FIG. 4C is a bottom view of the microscope cube of FIG. 2.

DETAILED DESCRIPTION

Figure 1:
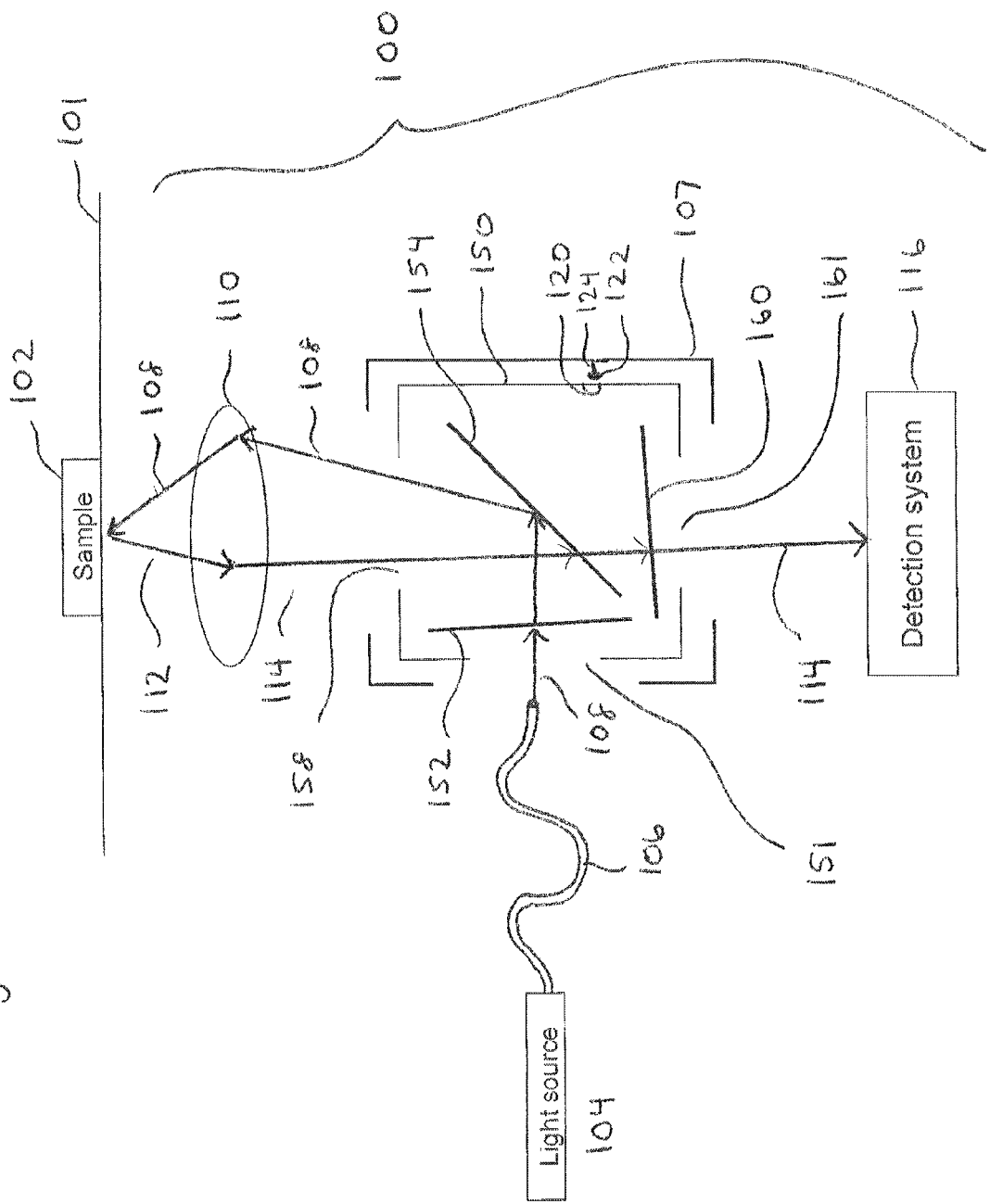
FIG. 1 is a schematic diagram of a microscope configured for Total Internal Reflection Fluorescence (TIRF) microscopy.

Referring to FIG. 1, a microscope 100 configured for total internal reflection fluorescence (TIRF) microscopy is used for imaging a sample 102 supported on a microscope stage 101. Sample 102 contains fluorophores that absorb light at an excitation wavelength and, in response to that light, fluoresce, emitting light at an emission wavelength longer than the excitation wavelength. A light source 104, such as a laser, generates light at the excitation wavelength of the fluorophores. Light source 104 is coupled to a fiber 106, which carries an excitation beam 108 from light source 104 to microscope 100. In some embodiments, light emitted from light source 104 passes directly to microscope cube 150 without being carried by a fiber. In other embodiments, excitation beam 108 passes through optical elements, such as lenses and apertures, before arriving at microscope cube 150. Excitation beam 108 enters a first port 151 of a microscope cube 150 that sits in a turret 107 of microscope 100.

A stopcock system holds microscope cube 150 within turret 107 of microscope 100. A ball 122 supported by a spring 124 in turret 107 is received by a small dovetail indent 120 on a side of microscope cube 150. The friction supplied by spring 124 holds microscope cube in position. The indent 120 further prevents microscope cube 150 from moving. A tight fit between balls 122 and indents 120 stabilizes microscope cube 150 in turret 107. In other embodiments, a mechanism is provided in turret 107 to lock microscope cube 150 in position. Alternatively, a hole is drilled into a side or base of the microscope cube (e.g., into dovetail indent 120) that allows the microscope cube to be bolted into place in the microscope. Such a bolted connection prevents any motion of the microscope cube within turret 107 or other slider mechanism of the microscope.

Referring to FIGS. 1 and 2, microscope cube 150 includes a short-pass excitation filter 152 that is housed in port 151 and which receives excitation beam 108 from fiber 106. In other embodiments, filter 152 is a band pass filter that transmits only components of excitation beam 108 having a wavelength similar to the excitation wavelength of the fluorophores in sample 102. Excitation beam 108 is transmitted through excitation filter 152 and is received by a long-pass dichroic mirror 154, which reflects light at the excitation wavelength of the fluorophores and transmits light at the emission wavelength of the fluorophores. Excitation beam 108 is thus reflected by dichroic mirror 154. Dichroic mirror 154 is oriented diagonally within microscope cube 150, e.g., at about a 45° angle relative to a side wall 156, such that excitation beam 108 is reflected toward sample 102 through an opening 158. In other embodiments, dichroic mirror 154 is a short-pass mirror that transmits excitation beam 108 and reflects light at the emission wavelength of the fluorophores. This embodiment of microscope cube 150 is often used with a custom arrangement of a microscope or a custom breadboard design.

Upon exiting microscope cube, excitation beam 108 passes through objective lens 110 and impinges on sample 102, where it excites fluorophores present in sample 102. The fluorophores fluoresce, emitting fluorescence light 112 at the emission wavelength of the fluorophores. The fluorescence 112 is collected by objective lens 110 and formed into an emission beam 114, which enters microscope cube 150 through opening 158. In microscope cube 150, emission beam 114 is transmitted through dichroic mirror 154 and strikes an emission filter 160 housed in a second port 161 in microscope cube 150. Emission filter 160 is a band pass filter that transmits light around the emission wavelength of the fluorophores and reflects other light, such as, for example, any light at the excitation wavelength that may have been reflected by sample 102. In some embodiments, emission filter 160 is a long pass filter. Emission beam 114 is thus transmitted through emission filter 160 and is directed out of microscope 100 to a detection system 116. Detection system 116 is, for instance, a sensor, a spectrophotometer, a CCD camera, or an eyepiece. In some embodiments, optical elements, such as lenses or beamsplitters, are present between emission filter 160 and detection system 116 in order to appropriately direct emission beam 114.

A flat dichroic mirror 154 with a smooth surface is preferable for use in TIRF microscopy, as there is less scatter of excitation beam 108 by imperfections in a flat, smooth mirror. In general, it is both less expensive and easier to generate a flat, smooth surface on a thick mirror than it is to do so on a thin mirror. Microscope cube 150 is configured to accept a dichroic mirror having a thickness greater than or equal to about 0.5 mm, such as greater than or equal to 1.5 mm, between about 1.5 mm and 3 mm, or between about 2 mm and 3 mm. However, a thick dichroic mirror 154 may have a non-negligible effect on the path of excitation beam 108 upon reflection toward objective lens 110, which effect is accounted for in any determination of the path of excitation beam 108.

Microscope cube 150 is removable from microscope 100. Since each type of fluorophore has its own unique excitation and emission spectra, a different combination of excitation filter 152, dichroic mirror 154, and emission filter 160 are used for each type of fluorophore. Thus, a microscope cube having a particular combination of filters and mirror can be assembled for use with a particular type of fluorophore. Depending on the type of fluorophore present in sample 102, a microscope cube having an appropriate combination of filters and mirror is inserted into turret 107 of microscope 100. Similarly, the filters and mirror in microscope cube 150 are selected for use with a particular light source. Microscope cube 150 is typically made of metal, which stabilizes the filters 152, 160 and mirror 154 in the microscope cube against torques, vibrations, and other mechanical disturbances.

Referring to FIGS. 1 and 3, excitation beam 108 passes through objective lens 110 and impinges on a surface 300 of sample 102 at an incidence angle 302. When incidence angle 302 nears a critical angle, total internal reflection of the excitation beam 108 occurs and the excitation beam is reflected as a reflected beam 304. An evanescent wave 306 having the same wavelength as excitation beam 108 is generated in sample 102 and excites fluorophores 308 near the surface 300 of the sample 102.

The incidence angle 302 at which excitation beam 108 strikes sample 102 is controlled by objective lens 110 and by the angle of dichroic mirror 154 within microscope cube 150 (see below). In TIRF microscopy, excitation beam 108 is focused at a focal point 310 on a rear focal plane 312 of objective lens 110. If focal point 310 is in the center of objective lens 110 (i.e., at a point 314), excitation beam 108 strikes sample 102 perpendicularly (i.e., with an incidence angle 302 of 0°). As focal point 310 is moved away from center 314 of objective lens 110, excitation beam 108 is refracted by objective lens 110 and emerges to impinge upon sample 102 at an incidence angle 302 greater than 0°. Thus, by appropriately positioning focal point 310, the critical incidence angle 302 can be achieved in order for total internal reflection of excitation beam 108 to occur.

Referring now to FIGS. 2 and 3, the position of focal point 310 on objective lens 110 is controlled by dichroic mirror 154. Thus, by changing the angle of dichroic mirror 154 within microscope cube 150, the angle of the excitation beam 108 as it emerges from the microscope cube is adjusted. In some embodiments, the angle of dichroic mirror 154 is adjustable by hand using a knob 162 or other similar device. In other embodiments, the angle of dichroic mirror 154 is adjustable in three dimensions by a set of posts 180, 182, 184 and adjustment screws 190, 192, 194 (see FIG. 4C). In other embodiments, the adjustment of dichroic mirror 154 is computer controlled, for example via piezoelectric drivers.

An adjustable dichroic mirror 154 also facilitates the alignment of microscope cube 150 within microscope 100, which alignment is generally performed with a laser jig alignment tool prior to insertion of microscope cube 150 into microscope 100. In other cases, alignment may be performed while the microscope cube is installed in the microscope, e.g., using piezoelectric drivers, enabling precise adjustments to be made to optimize the geometry of the microscope cube for the particular microscope in which it is installed. Microscope cube 150 can be used in various microscopes; by adjusting the angle of the dichroic mirror, the optical elements in the microscope cube can be aligned with optical elements of the particular microscope in which the cube is inserted.

Referring to FIGS. 4A and 4B, excitation beam 108 from fiber 106 strikes excitation filter 152, which is tilted by an angle 400 relative to a first wall 402 of microscope cube 150. Angle 400 is limited mainly by physical constraints of cube 150 and by requirements for a clear aperture in the path of excitation beam 108. Angle 400 ranges from about 0° to 10° and is typically about 3.75°. In some cases, the composition of a coating of filter 152 is chosen on the basis of angle 400. In some embodiments, angle 400 is adjustable using a wedge washer 401. Due to the tilt of excitation filter 152, any light 404 that is reflected by excitation filter 152 is not directed back along the same path as incident excitation beam 108. Reflected light 404 is thus prevented from re-entering fiber 106 and light source 104. Re-entry of reflected light is of particular concern for laser light sources, as such a situation could potentially induce harmful interference patterns in the laser cavity capable of damaging or even destroying the laser. Excitation port 151 is designed to accept an excitation filter 152 having a thickness up to 6 mm. A 6 mm clearance allows excitation filter 152 to be selected from a wide variety of types of filters. Furthermore, the 6 mm clearance also allows multiple thin optical elements to be inserted into excitation port 151. For instance, port 151 may house a short pass excitation filter to select the excitation wavelength and a neutral density filter to reduce the power of the excitation beam.

Similarly, referring to FIGS. 4B and 4C, emission filter 160 is tilted by an angle 406 relative to a second wall 408 of microscope cube 150 in order to reduce internal reflection of emission beam 114. Angle 406 is limited mainly by physical constraints of cube 150 and by requirements for a clear aperture in the path of emission beam 114. Angle 406 ranges from about 0° to 10° and is typically about 4°. In some embodiments, angle 406 is adjustable using a wedge washer 407 located in emission port 161. Emission port 161 is designed to accept an emission filter 160 having a thickness up to 6 mm. As with excitation port 151, a 6 mm clearance allows emission filter 160 to be selected from a wide variety of options, or alternatively allows multiple thin optical elements to be inserted into emission port 161. For instance, in one embodiment, a long pass emission filter housed in a 2.3 mm thick ring is used with a band pass emission filter housed in a second 2.3 mm thick ring. Each filter alone supplies a blocking of optical density (o.d.) of 6. The two filters used together supply an o.d. of close to 9.

A ridge 410 is positioned in a region of microscope cube 150 that receives a large amount of undesirable scattered and/or reflected light. Ridge 410 acts as a baffle, absorbing this undesirable light or otherwise preventing the light from entering the path of excitation beam 108 or emission beam 114.

Figure 5:
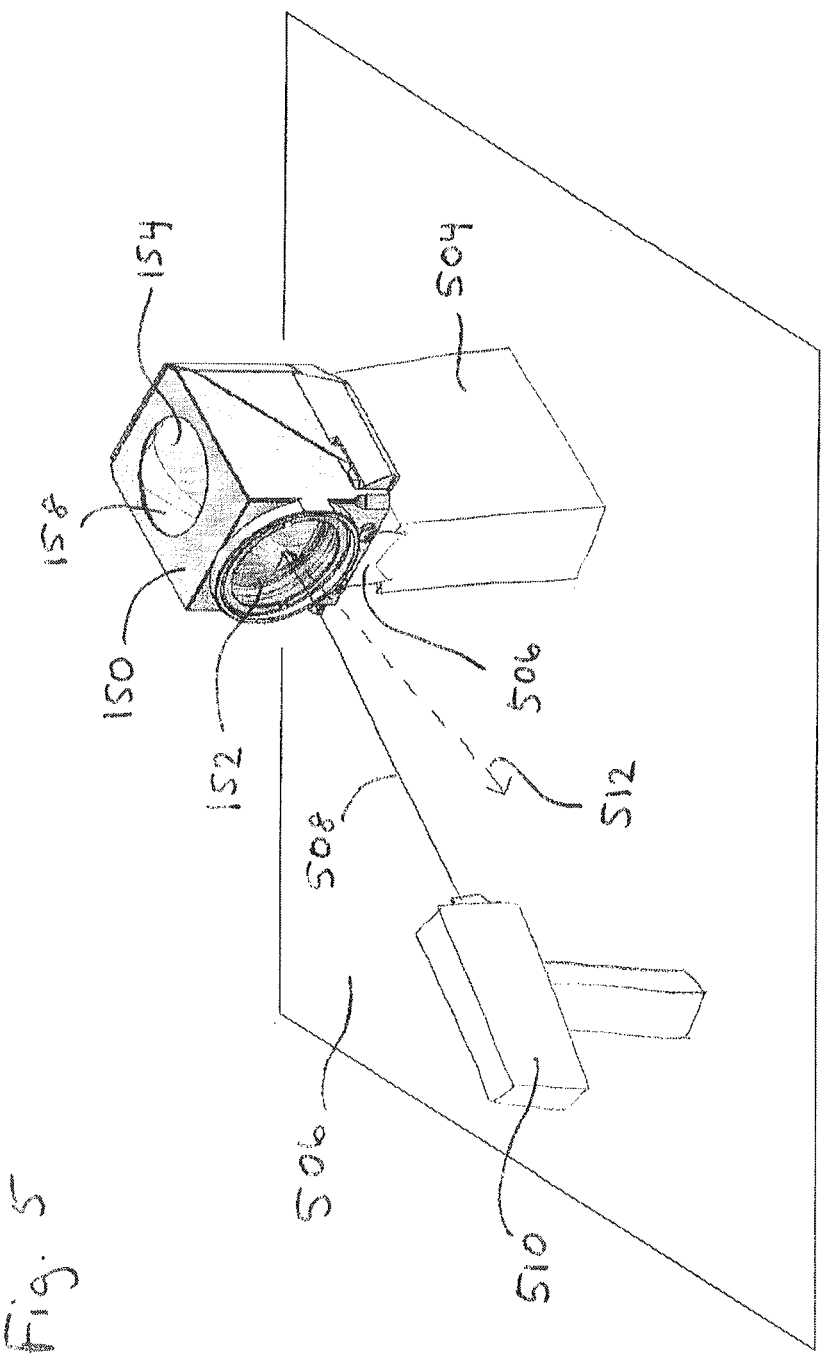
FIG. 5 shows a microscope cube used in a laser breadboard setup.

Referring to FIG. 5, in another embodiment, a microscope cube 500 includes a dovetail adapter 502 configured to attach to a post 504 for use on a laser breadboard 506. In this embodiment, microscope cube 500 receives direct illumination from a light source 508 such as a plasma laser. A tilted excitation filter 510 prevents light from being reflected back into light source 508.

Referring to FIG. 5, a dovetail adapter 500 allows microscope cube 150 to be attached a post 504 for use on a laser breadboard 506. In other embodiments, a screw or other type of adapter is used for attachment to post 504. Microscope cube 150 receives direct illumination 508 from a light source 510, such as a plasma laser and/or other light sources. The tilt of excitation filter 152 prevents any light 512 that is reflected by the excitation filter from being directed back along the same path as incident illumination 508. The reflected light is thus prevented from re-entering the laser, avoiding a situation which could induce an interference pattern in the laser cavity and potential damage or even destroy the laser.

It is to be understood that the foregoing description is intended to illustrate and not to limit the scope of the invention, which is defined by the scope of the appended claims. Other embodiments are within the scope of the following claims.

What is claimed is:

1. A microscope cube comprising:
  a housing including a first opening on a first wall of the housing and a second opening on a second wall of the housing, the first wall adjacent to the second wall;
  an excitation filter disposed within the first opening;
  an emission filter disposed within the second opening; and
  a dichroic mirror positioned within the housing, the dichroic mirror having a thickness greater than or equal to 1.5 mm.

2. The microscope cube of claim 1, wherein the dichroic mirror has a thickness between 2 mm and 3 mm.

3. The microscope cube of claim 1, wherein the dichroic mirror is positioned to receive light incident from the first opening and light incident from the second opening.

4. The microscope cube of claim 1, wherein the excitation filter is positioned at an angle relative to the first wall of the housing.

5. The microscope cube of claim 1, wherein the emission filter is positioned at an angle relative to the second wall of the housing.

6. The microscope cube of claim 1, wherein an angle between the dichroic mirror and the first wall is adjustable.

7. The microscope cube of claim 6, wherein the angle between the dichroic mirror and the first wall is adjusted manually.

8. The microscope cube of claim 6, wherein the angle between the dichroic mirror and the first wall is adjusted by a piezoelectric driver.

9. The microscope cube of claim 1, wherein an angle between the dichroic mirror and the second wall is adjustable.

10. The microscope cube of claim 1, further comprising a third wall in contact with both the first wall and the second wall,
wherein an angle between the dichroic mirror and the third wall is adjustable.

11. The microscope cube of claim 1, wherein the microscope cube is configured for removable insertion into a microscope.

12. The microscope cube of claim 1, wherein the microscope cube is configured to receive light from a laser.

13. The microscope cube of claim 1, wherein the microscope cube is made of metal.

14. The microscope cube of claim 1, further comprising an adapter for attachment to a laser breadboard.

15. The microscope cube of claim 1, wherein optical characteristics of the excitation filter, the emission filter, and the dichroic mirror are selected on the basis of optical characteristics of a target sample.

16. The microscope cube of claim 1, wherein an angle between the dichroic mirror and the first wall is about 45°.

17. The microscope cube of claim 1, wherein an angle between the dichroic mirror and the second wall is about 45°.

* * * * *